Jan. 8, 1935.  C. H. INMAN ET AL  1,987,298
DROPPING BOARD CLEANER OR SCRAPER
Filed May 9, 1933   2 Sheets-Sheet 1
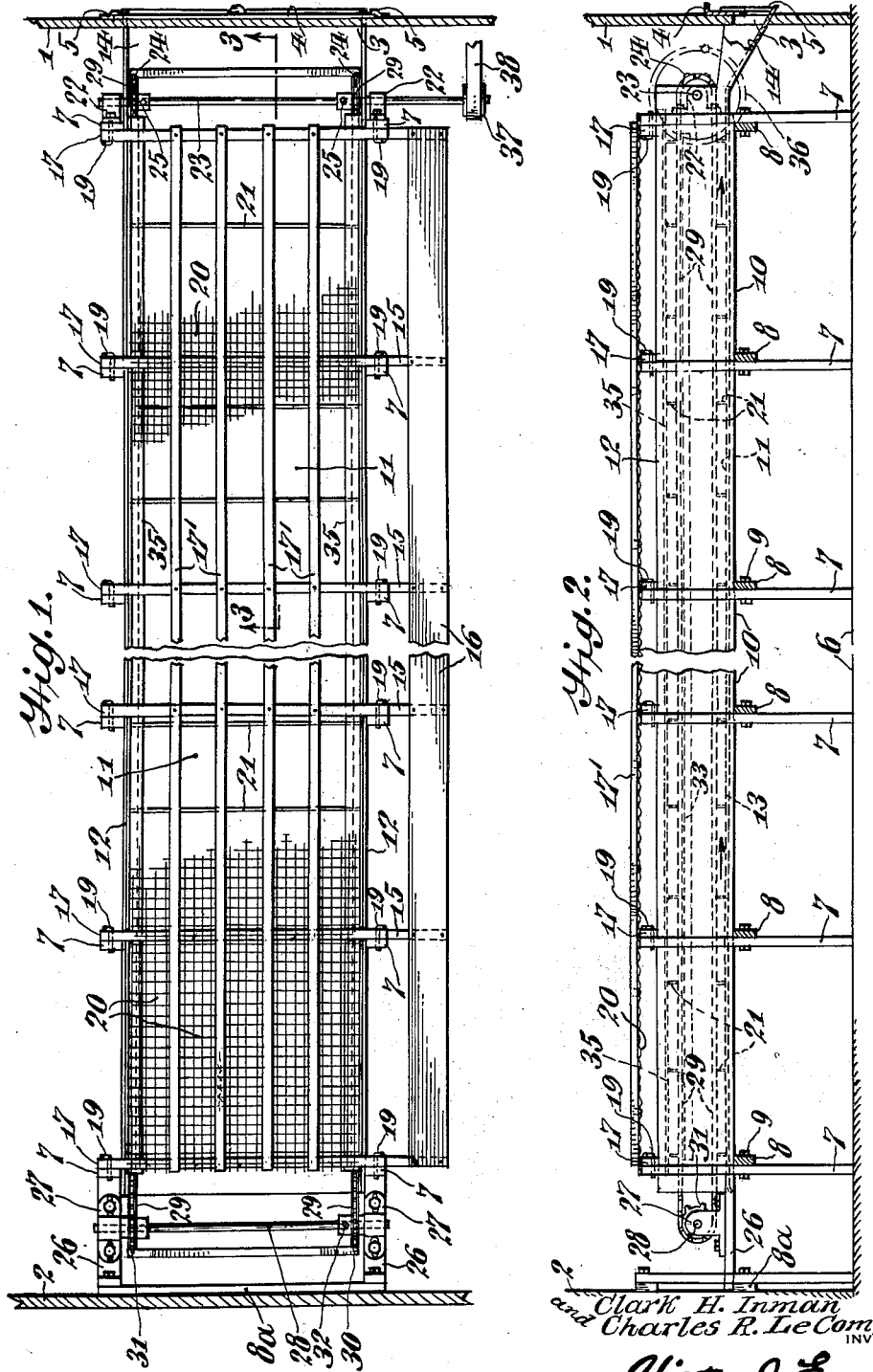
Clark H. Inman
Charles R. LeCompte, INVENTOR
BY Victor J. Evans
ATTORNEY

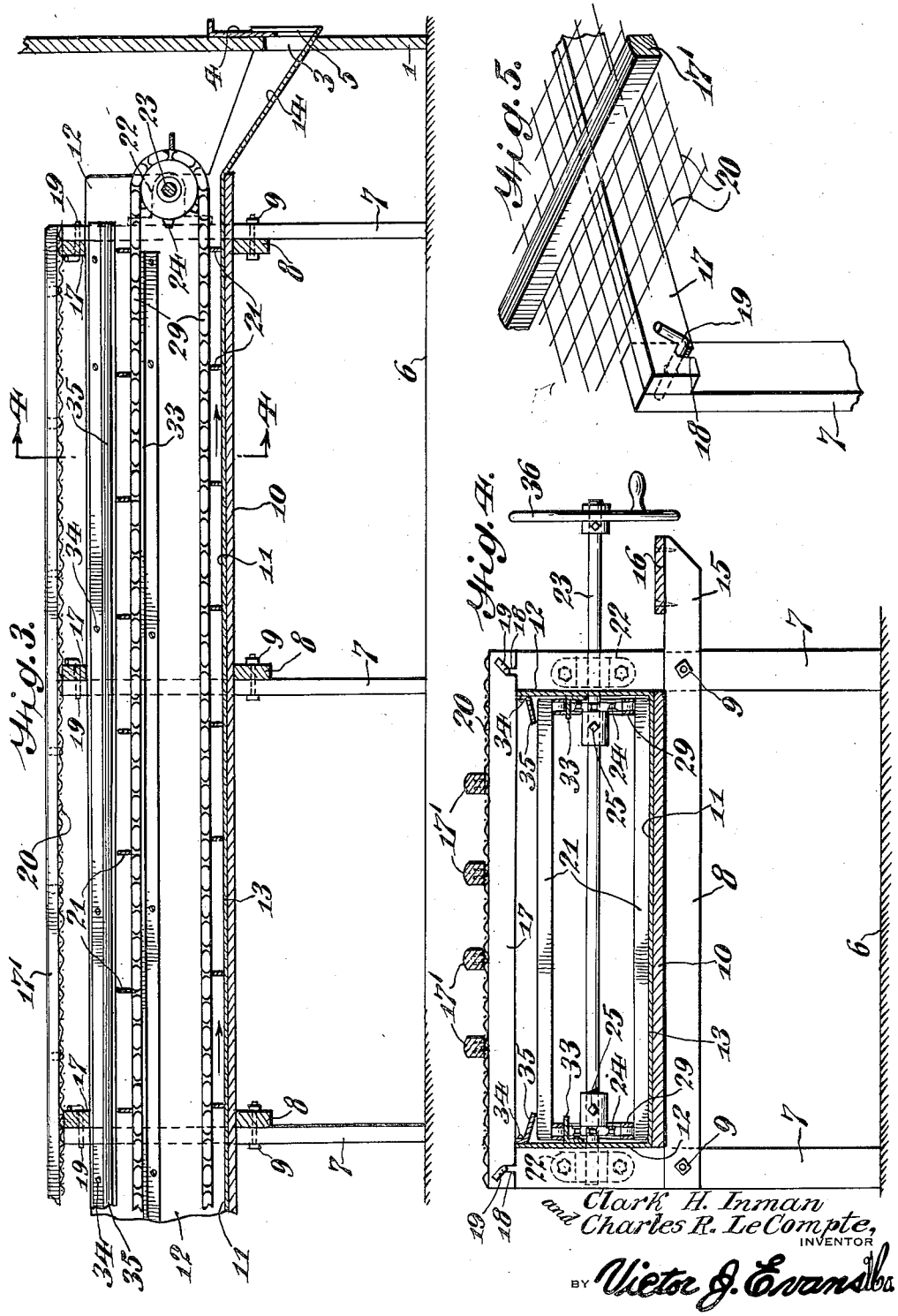

Patented Jan. 8, 1935

1,987,298

UNITED STATES PATENT OFFICE 1,987,298

DROPPING BOARD CLEANER OR SCRAPER

Clark H. Inman and Charles R. Le Compte, Lakewood, N. J.; said Inman assignor of his right to Ethel Inman, Lakewood Township, Ocean County, N. J.

Application May 9, 1933, Serial No. 670,201

5 Claims. (Cl. 119—22)

This invention relates to roosts for various fowls or poultry, particularly such as chickens, pigeons and the like and more especially to an improved dropping board cleaner or scraper, for cleaning or scraping the refuse or droppings from the dropping board, conveying the droppings toward one end of the roost to a discharge opening, from which the droppings may travel down an inclined chute and into a receptacle exteriorly of the housing of the roost.

The invention has for its purpose to provide a device of this kind, which is simple and practical in construction and comprises endless traversers operating over sprockets at both ends of the roost, said traversers carrying scrapers, which convey the droppings on the dropping board to the discharge end of the roost or housing and allow it to descend an inclined chute into a receptacle or container, the container or receptacle when filled adapted to be removed and emptied.

Another purpose is to provide means for supporting the dropping trough or board in a manner that the bottom of the trough or dropping board will lie flat, so that its entire surface may be easily cleaned or scraped, the cleaners or scrapers extending entirely from one side of the dropping trough or board to the other, in order that all the refuse or droppings may be removed.

Another purpose is to provide means on the sides of the dropping trough or board to overlie the traversers to prevent the refuse or droppings from reaching the endless traversers, and causing the droppings or refuse to be deflected upon the bottom of the dropping trough or board.

Still another purpose is to provide improved supporting means for upper stringers (which support the perches or roosting poles and poultry wire) so that after removing the poultry wire and the roosting poles or perches, the upper stringers can be removed, in order to permit of a general cleaning of the roost.

It is to be understood that the particulars herein given are in no way limitative and while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a plan view of the improved roost for fowls or poultry, especially chickens, pigeons and the like, showing the improved dropping board cleaner or scraper as applied.

Figure 2 is a view in side elevation of the apparatus as shown in Figure 1.

Figure 3 is a sectional view on line 3—3 of Figure 1.

Figure 4 is a sectional view on line 4—4 of Figure 3.

Figure 5 is a perspective view of one of the side uprights, showing the manner of supporting the upper stringers, which in turn support the poultry wire and the perches or roosting poles, so that such stringers and poultry wire and perches or roosting poles can be easily removed for a general cleaning.

It is obvious that this improved dropping board cleaner or scraper may be made of any length or size, adapting it for roosting houses of various lengths, heights and widths.

Referring to the drawings 1 and 2 identify front and rear walls of a roosting house for various fowls such as chickens and pigeons and the like, and the front wall has a discharge opening 3, there being a slide closure 4 mounted in guides 5, so that when the cleaner or scraper is operating the refuse or droppings may pass out through the discharge opening, after opening the door.

Upstanding from the floor 6 of the fowl or roost housing are uprights 7, which may be spaced apart throughout the length of the roost any suitable distance, and spaced apart transversely, depending on the width of the roost. It is obvious that the roost can be any length and of any width, it also depending on the dimensions or size of the housing.

Mounted mid way of the upright 7, transversely of the roost are lower stringers 8, which are fastened to the uprights as shown at 9, and resting on the lower stringers is a suitable flooring 10, which may be constructed of boards of suitable length, according to the length of the roost. Resting upon the flooring 10 is a metal trough 11 constructed of sheet metal of any suitable gauge, the sides 12 of the trough extending to the top near the roost. The combination of the flooring 10 together with the bottom 13 of the trough constitutes a dropping board for the droppings from the fowl. The bottom 13 of the trough at a point adjacent the discharge opening 3 is extended as identified at 14 and inclined downwardly through the discharge opening 3, thereby constituting a chute for the droppings, when the cleaner or scraper is in motion.

The lower stringers 8 are extended beyond one side of the roost and mounted on such extensions 15 is a step or support 16 upon which the fowl may first rest before ascending to the various perches 17'.

Extending transversely of the roost and lying against certain of the sides of the uprights 7 at their upper ends are upper stringers 17, the ends of which have notches 18, which straddle the shanks of angular pins 19.

These pins are inserted through the upper ends of the uprights 7.

Resting on the upper stringers is an area of poultry wire mesh 20, and on the wire mesh the perches 17' rest, and due to the provision of the poultry wire mesh 20 the fowl are prevented from falling through the frame work and down in the trough upon the dropping board, and possibly in between cleaner blades or scrapers 21.

Carried by certain of the uprights 7 near the front wall of the housing are bearings 22 in which a power shaft 23 is mounted. This power shaft carries sprocket wheels 24, the hubs of which are secured to the shaft as at 25. The flooring 10 is extended beyond the rear end of the roost and is connected to a lower stringer 8a, and mounted upon this extension 26 of the flooring are take up or adjustable bearings 27, in which a shaft 28 is mounted. By reason of the take up or adjustable bearings, it is possible to tighten or loosen the endless chain traversers 29, which pass about the sprockets 24, and also about the sprockets 30 and 31, which are associated with the shaft 28. The sprocket 30 is made fast at 32 to the shaft 28 while the sprocket 31 is loose on the shaft, the idea being to equalize the tension.

The cleaner or scraper blades 21, which may be any suitable construction and of any suitable material are secured in any suitable manner (not shown) to certain links of the chain traversers 29, and are arranged at right angles to the traversers, so that the cleaner blades or scrapers may engage edgewise on the bottom of the metal trough which constitutes the dropping board, and in this manner supporting the lower part of the chain traversers.

Interiorly of the metal trough and secured to its sides are stringers 33, which are angular and are designed to support the upper portion of the chain traversers, so as to prevent any sagging of the chain. Also secured at 34 to the inner faces of the sides of the trough are metal sheds 35, which are angular in cross section and overlie the upper portions of the chain traversers, said sheds acting to deflect the droppings from falling upon the chain traversers.

It is obvious that by removing the perches or roosting poles 17' and then removing the poultry wire, it is possible to give the roost a thorough cleaning, and which may be done at any time convenient to the user of the roost.

While there is shown a hand wheel 36 as applied to the shaft 23 for rotating the same, it is possible to attach a pulley 37 including a belt 38 as shown in Figure 1 and which belt may be driven by any suitable motor or the like.

The invention having been set forth, what is claimed is:

1. In a fowl roost including a frame, a dropping board consisting of a trough having a discharge end and mounted on the frame, the upper portion of the frame including removable stringers, poultry wire supported thereon, perches or roosting poles resting on the wire, and an endless open traverser including scraper blades operating longitudinally through the trough and mounted between the trough and the poultry wire, the edges of the scraper blades contacting with the bottom of the trough, thereby conveying the droppings toward said discharge end, rails for supporting the upper parts of the endless traversers, means above and parallel to the rails for shedding the droppings from the upper portions of the endless traversers, a housing for the roost provided with a discharge opening in one of its walls adjacent the discharge end of the roost, and a chute at and connected to one end of the trough and supported on the lower wall of the discharge opening of the housing.

2. In a fowl roost including a housing and a roost frame therein, said frame having a plurality of upper and lower transverse stringers, a flooring and a trough thereon supported by the lower stringers, perches or roosting poles supported on the upper stringers, said flooring and the bottom of the trough constituting a dropping board having a discharge end, endless open traversers mounted longitudinally on the frame and located between the perches or roosting poles and the trough, said endless traversers having scraper blades, certain edges of which engage with the dropping board, thereby not only supporting the lower portions of the traversers but acting to scrape the droppings toward said discharge end of the dropping board, and means for supporting the upper portions of the traversers.

3. In a fowl roost including a housing and a roost frame therein, said frame having a plurality of upper and lower transverse stringers, a flooring and a trough thereon supported by the lower stringers, perches or roosting poles supported on the upper stringers, the flooring and the bottom of the trough constituting a dropping board having a discharge end, endless open traversers mounted longitudinally on the frame and located between the perches or roosting poles and the trough, said endless traversers having scraper blades, certain edges of which engage with the dropping board, thereby not only supporting the lower portions of the traversers but acting to scrape the droppings toward said discharge end of the dropping board, means for supporting the upper portions of the traversers, the housing having a discharge opening adjacent the discharge end of the dropping board, a chute connecting the discharge end of the dropping board and the discharge opening, and means for shedding the droppings from the upper portions of the endless traversers.

4. In a device as set forth, the combination with a fowl roost frame having side uprights, of a housing therefor, said roost frame having lower transverse stringers including means for fastening them to the side uprights of said frame, a flooring and a trough thereon supported on said lower stringers and constituting a dropping board, upper transverse stringers detachably supported on the upper ends of said uprights of said frame, a roost removably supported upon the upper transverse stringers, endless open traversers mounted adjacent the inner faces of the longitudinal sides of said trough and having transverse scrapers, the lower ones of which ride upon the bottom of the trough, angle rails extending along the length of the inner faces of the sides of the trough for supporting the upper portions of said traversers to support and prevent sagging of the upper portions of the traversers, the scrapers acting to scrape the droppings longitudinally of the trough and toward one end thereof, and means secured to the inner faces of the sides of the trough adjacent the upper edges of said sides and overlying the upper portions of the endless traversers for shedding the droppings therefrom.

5. In a device as set forth, the combination with a fowl roost frame, of a housing therefor, said roost frame having lower transverse stringers including means for fastening them to side uprights of said frame, a flooring and a trough thereon supported on said lower stringers and constituting a dropping board, upper transverse stringers detachably supported on the upper ends of said uprights of said frame, a roost removably supported upon the transverse stringers, endless open traversers mounted adjacent the inner faces of the longitudinal sides of said trough and having transverse scrapers, the lower ones of which ride upon the bottom of the trough, angle rails extending along the length of the inner faces of the sides of the trough for supporting the upper portions of said traversers to support and prevent sagging of the upper portions of the traversers, the scrapers acting to scrape the droppings longitudinally of the trough and toward one end thereof, and means secured to the inner faces of the sides of the trough adjacent the upper edges of said sides and overlying the side edges of the upper portions of the endless traversers for shedding the droppings therefrom, said roost comprising poultry wire mesh on the upper transverse stringers, perches resting upon the poultry wire mesh, said mesh acting to prevent the fowl from falling through the frame into the trough, the end of the trough toward which the droppings are scraped having a discharge opening, one end of the housing adjacent said discharge having a discharge opening, and a chute connecting the discharge opening of the trough and the discharge opening of the housing and resting on the upper wall of the housing opening for conducting the droppings from the trough and from within the housing.

CLARK H. INMAN.
CHARLES R. LE COMPTE.